(12) United States Patent
Gehde

(10) Patent No.: US 6,186,210 B1
(45) Date of Patent: Feb. 13, 2001

(54) HEAT SEALING DEVICE

(75) Inventor: Michael Gehde, Aachen (DE)

(73) Assignee: Wegener GmbH (DE)

( * ) Notice: Under 35 U.S.C. 154(b), the term of this patent shall be extended for 0 days.

(21) Appl. No.: 09/184,013

(22) Filed: Nov. 2, 1998

(51) Int. Cl.[7] .................................................. B44C 7/00
(52) U.S. Cl. ........................ 156/499; 156/544; 156/555; 156/579
(58) Field of Search .................................. 156/499, 544, 156/555, 579, 574, 577

(56) References Cited

U.S. PATENT DOCUMENTS

| | | | |
|---|---|---|---|
| 4,447,288 | * 5/1984 | Seaman | 156/574 |
| 4,744,855 | * 5/1988 | Ellenberger et al. | 156/499 |
| 4,923,558 | 5/1990 | Ellenberger et al. | 156/499 |

FOREIGN PATENT DOCUMENTS

| | | |
|---|---|---|
| 3443914 | 6/1986 | (DE) . |
| 4000017 | 7/1991 | (DE) . |
| 9110487 | 1/1992 | (DE) . |
| 9110488 | 1/1992 | (DE) . |
| 9114932 | 3/1992 | (DE) . |
| 296 20 216 U | 4/1997 | (DE) . |

* cited by examiner

Primary Examiner—James Sells
(74) Attorney, Agent, or Firm—Liniak, Berenato, Longacre & White, LLC

(57) ABSTRACT

The invention concerns a heat-sealing device for overlapping heat-sealing of film edges, having pressure rollers, for pressing the film edges together after they are heated, which sit on shafts of which at least one is movably guided in the direction of the other shaft and vice versa.

20 Claims, 3 Drawing Sheets

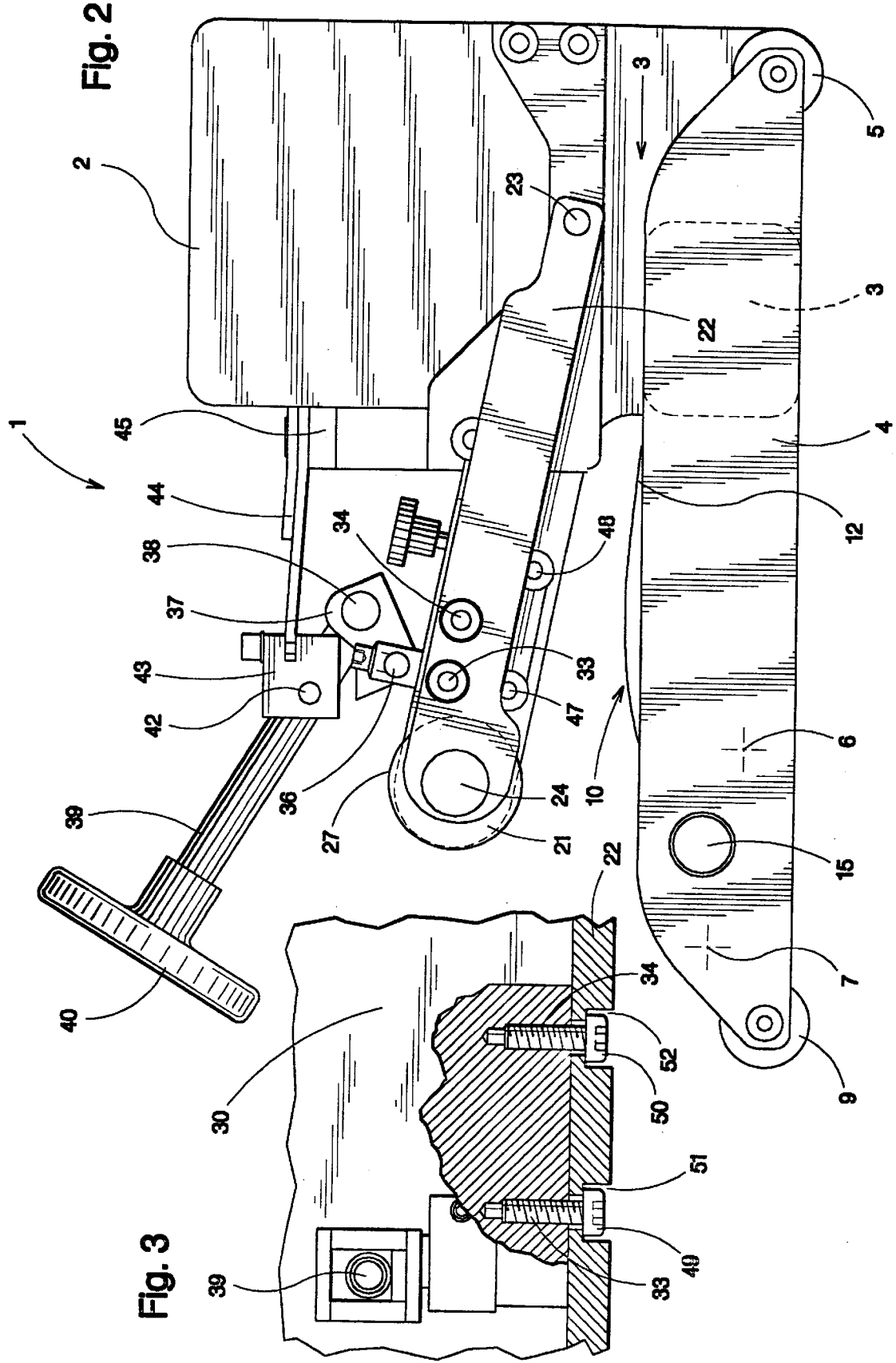

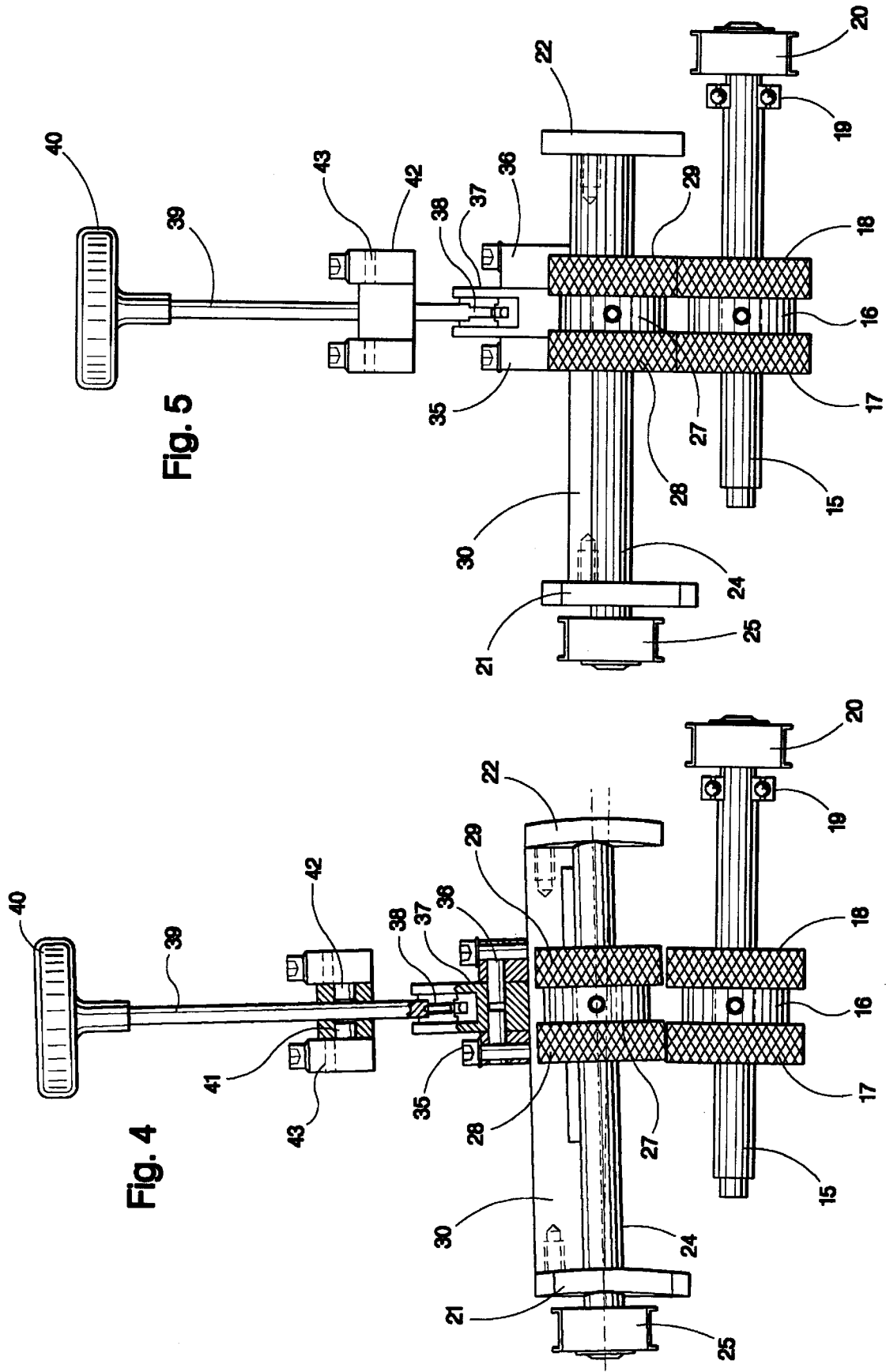

HEAT SEALING DEVICE

Figure 1:
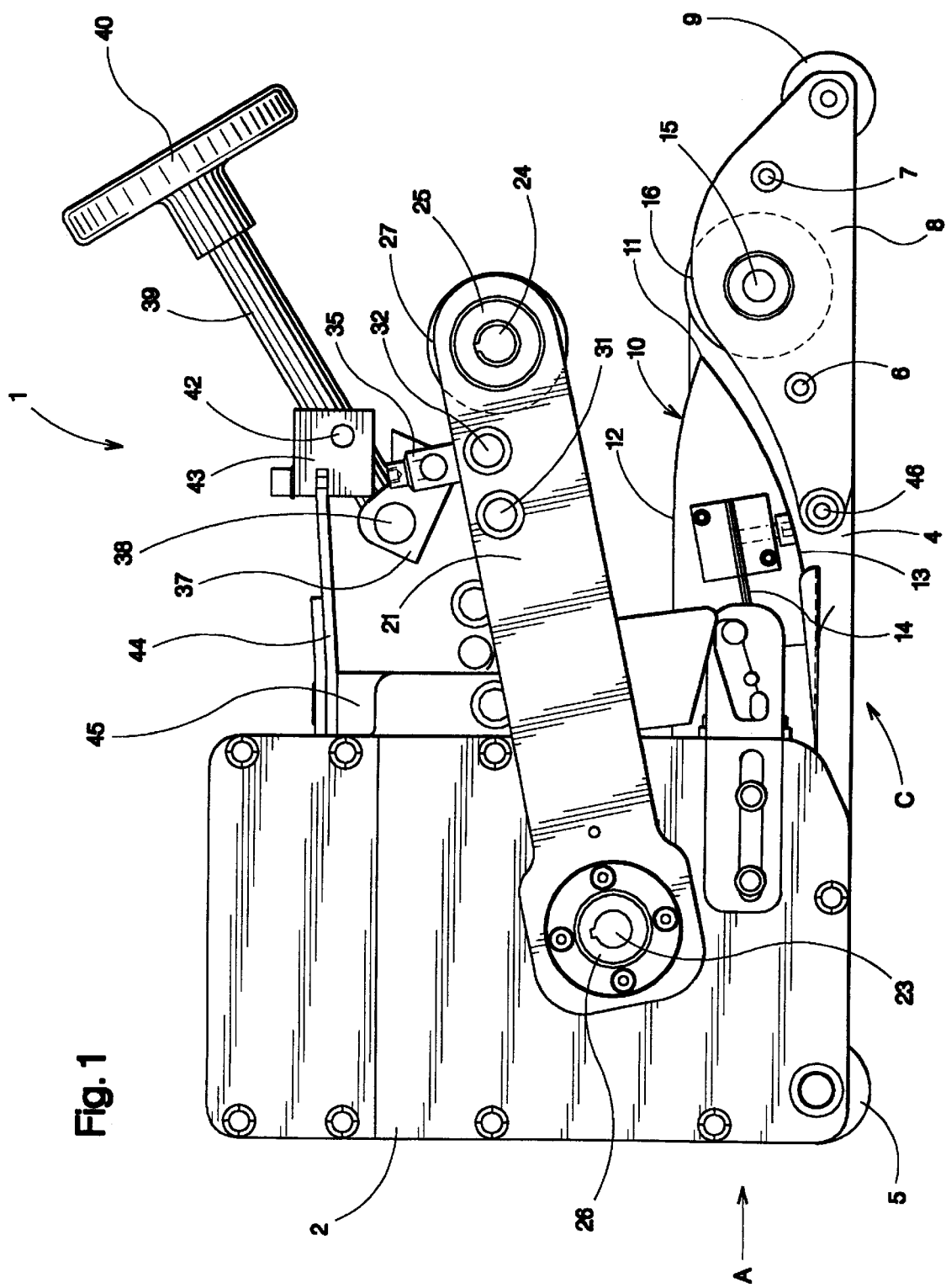

The invention concerns a heat-sealing device for overlapping heat-sealing of film edges, having pressure rollers, for pressing the film edges together after they are heated, which sit on shafts of which at least one is movably guided in the direction of the other shaft and vice versa.

Heat-sealing devices of the kind described above are used in particular for heat-sealing of films in landfill construction. The purpose of the films is to seal the base of the landfill. In this context, stringent demands are made on the quality of the seal.

A heat-sealing device of this kind is known, for example, from DE 40 000 017 A1 and from DE 296 20 216.9. It has an infeed side over which the overlapping film edges are fed in one above another as the heat-sealing device is displaced, and are guided over a wedge-shaped heating element. This heating element is arranged horizontally, i.e. the two wedge surfaces which simultaneously also constitute the heating surfaces are located one above another. The heating element is oriented with its blunt end toward the infeed side. The top film edge is guided over the upper heating surface, and the bottom film edge over the lower heating surface. The two heating surfaces come together toward the discharge side in a linear wedge tip.

Pressure rollers lying one above another, which sit on shafts which extend horizontally and transverse to the defined passthrough direction of the film edges, are located directly behind the heating element. The film edges, heated and plasticized on the sides facing one another, are passed through between the pressure rollers and thereby pressed against one another in such a way that the plasticized surfaces melt into one another, and a heat-sealed join results after cooling.

The pressure rollers can be mounted in freely rotatable fashion on the shafts, or can rotate along with the shafts. In the latter case, there exists the possibility of driving one of the shafts, or even both of the shafts with the pressure rollers located thereon, in motorized fashion. In this case the pressure rollers also serve as feed rollers, i.e. they pull the film edges into the heat-sealing device and—since the film edges are usually designed to be stationary and thus are immovable—thus cause the heat-sealing device to be fed forward.

In the known heat-sealing devices, one of the shafts is usually mounted immovably on the unit and the other shaft is guided movably relative to the one shaft. Guidance occurs via one or two pivot arms, the pivot arms in the latter case running parallel to one another and being pivotable independently of one another. The shaft extends between the pivot arms, the pivot arm being movable, with the aid of an actuation device, toward and away from the other shaft.

Although the applied pressure acting between the pressure rollers can be adjusted, the heat-seal quality has occasionally not been satisfactory. Quality problems have occurred in particular when two heat-sealed seams were provided in order to form a testing channel between them, i.e. the heat-sealed seam have proven not to be sufficiently tight.

It is the object of the invention to configure a heat-sealing device of the kind cited initially in such a way that heat-sealed seams can be produced with greater reliability and quality.

According to the invention, this object is achieved in that at least one of the shafts can be aligned, via an adjustment device, parallel to the other shaft, and can be secured in that position.

This idea is based on the recognition, already part of the invention, that the position of the shafts carrying the pressure rollers has a substantial influence on the quality of the heat-sealed seam or seams. Even minor deviations from parallelism of the shafts means that the inherently provided width of the heat-sealed seam, and thus its strength, are not achieved. When two heat-sealed seams located spaced apart next to one another are being generated, lack of parallelism of the shafts can result in incomplete formation of one of the two heat-sealed seams. With the aid of the adjustment device according to the present invention, it is possible to set the two shafts exactly parallel to one another. This can advantageously be done in such a way that the pressure rollers are pressed toward one another with the aid of the actuation device, and then the one shaft is displaced by means of the adjustment device until the pressure rollers are in linear contact over their entire width. This can be checked, for example, with the aid of a piece of paper passed through the pressure rollers.

It has been found that adjustment of the shafts with the goal of setting them exactly parallel to one another results in perfect and reproducible heat-sealed seams. One reason for quality problems in the heat-sealed seams has thus been eliminated.

In a development of the invention, provision is made for the adjustment device to be associated with the movably guided shaft. Of course the adjustment device can also be arranged on the shaft mounted immovably on the unit, or both shafts can also be equipped with adjustment devices, although this is complex.

If the shaft is suspended at both ends, which is generally the case, there exists the possibility of providing the adjustment device in the region of one of the two shaft ends, so that this shaft end can be secured displaceably to the suspension mount there and its angular position can thereby be influenced. If the shaft is retained on two pivot arms, the adjustment device can be configured so that it connects the two pivot arms to one another and thus synchronizes their movement in such a way that the shaft extending between them runs exactly parallel to the shaft mounted immovably on the unit. In this case the adjustment device is advantageously configured as a bridge between the pivot arms which is attached detachably at least to one of the pivot arms, the attachment being displaceable. The attachment can, for example, be configured as a screw attachment. After loosening of the screws, the pivot arms can be set with respect to one another in such a way that the shaft retained by them ends up parallel to the other shaft. The screws can then be tightened again, and the position attained can thus be secured. The pivot arms can be joined to one another in such a way that the shaft guided by them runs parallel to the other.

The drawings illustrate the invention in more detail with reference to an exemplifying embodiment, and show:

in FIG. 1, the one side view of a heat-sealing device according to the present invention;

in FIG. 2, the other side view of the heat-sealing device according to FIG. 1;

in FIG. 3, a magnified portion of the circular portion designated "x" in FIG. 2, with a sectioned depiction in plane A—A;

in FIG. 4, a partial rear view of the heat-sealing device according to FIGS. 1 and 3, before adjustment; and in FIG. 5, the view depicted in FIG. 3, after adjustment.

Heat-sealing device 1 depicted in the Figures has a housing 2 on which a drive motor (not depicted here further) is flange-mounted in transverse orientation, i.e. perpendicular to the drawing plane of FIGS. 1 and 2. Housing 2 extends, viewed from the input side, over only a portion of the right-hand side (at the front in FIG. 1). Attached to housing 2 in the lower region is a crossmember 3 which extends horizontally and on whose left-hand side as viewed from the input side (arrow A) a longitudinal member 4, which is at the front in FIG. 2, is attached.

On the input side, a displacement roller 5 is mounted at one end on housing 2 and at the other end on longitudinal member 4. It extends over almost the entire width of heat-sealing device 1. In the region of the output of heat-sealing device 1, two retaining studs 6, 7 extend from the inner side of longitudinal member 4 over almost the entire width of heat-sealing device 1. Attached to it on its right-hand side as viewed from the input side (arrow A) is a retaining panel 8 which is at the front in FIG. 1 and extends substantially vertically. On the output side a second displacement roller 7 extends between longitudinal member 4 and retaining panel 8. It is mounted on longitudinal member 4 and retaining panel 8 so as to rotate freely. The two displacement rollers 5, 9 allow heat-sealing device 1 to be displaced along a surface.

Located approximately in the center of heat-sealing device 1 is a wedge-shaped heating element 10 whose wedge tip 11 is located on the output side. Heating element 10 has an upper heating surface 12 and a lower heating surface 13. It is suspended at both ends on leaf-spring arms 14 (visible only in FIG. 1). The ends of leaf-spring arms 14 which are not visible are attached to a carriage which is horizontally displaceable in crossmember 3. Heating element 10 can thus be shifted in and opposite to the direction of travel of heat-sealing device 1.

A rotary shaft 15 also extends between longitudinal member 4 and retaining panel 8, transversely across the width of heat-sealing device 1. A pressure roller 16, which has two spaced-apart, profiled roller sections 17, 18, is attached on rotary shaft 15. Rotary shaft 15 passes through longitudinal member 4 and a bearing 19 thereon, and has externally a chain wheel 20 over which a chain (not depicted) runs. The chain is driven by an output of the drive motor and by a further pinion which is omitted here for the sake of clarity.

Mounted on the exterior of housing 2 is a pivot arm 21 proceeding obliquely upward toward the output side. A second pivot arm 22 is mounted parallel thereto and aligned in the same fashion on the other side of housing 2, and about the same transverse shaft 23. Pivot arms 21, 22 are not joined to one another in the region of their mounts.

Their free ends are joined to one another via a rotary shaft 24, which is mounted in freely rotatable fashion on the left-hand (as viewed from the input side) pivot arm 22, and passes through the right-hand pivot arm 21. A chain wheel 25 sits on the exterior of pivot arm 21 on rotary shaft 24. It corresponds to a pinion 26 which sits, coaxially with transverse shaft 23, on a drive shaft of the gear drive. A chain (not depicted here) is tensioned between chain wheel 25 and pinion 26. The two rotary shafts 15, 23 can thus be driven, specifically in opposite directions.

Also sitting on transverse shaft 23 is a pressure roller 27 which, in the same manner as pressure roller 16, has two profiled roller sections 28, 29 (FIGS. 4 and 5). Pressure rollers 16, 27 are arranged with respect to one another in such a way that the left-side roller sections 17, 28 and right-side roller sections 18, 29 end up in contact against one another when pivot arms 21, 22 are moved downward. This mutual contact is apparent from FIGS. 4 and 5.

In the space between housing 2 and rotary shaft 24, the spacing between pivot arms 21, 22 is bridged by a bridge piece 30. Bridge piece 30 is attached to the right-hand (viewed from the input side) pivot arm 21 via two attachment screws 31, 32 located next to one another, and to the left-side pivot arm 22 via two adjustment screws 33, 34 again located next to one another. Bridge piece 30 thus connects pivot arms 21, 22.

Screwed onto bridge piece 30 at a spacing from one another are two bearing brackets 35, 36 in which a pivot element 37 is mounted. Pivot element 37 has at its free end an articulated joint 38 via which it is joined to a spindle 39 which carries at the end a handwheel 40. Spindle 39 sits in a spindle nut 41 which is mounted about a horizontal shaft 42 in a coupling piece 43. Coupling piece 43 is screwed at the free end onto a leaf spring 44 which at the other end is clamped onto an extension 45 of housing 2.

By means of the mechanism described above, bridge piece 30 and thus pivot arms 21, 22 can be pivoted out of the open position shown in FIGS. 1 and 2 into the contact position depicted in FIGS. 4 and 5. This is done by pivoting spindle 39 counterclockwise in FIG. 1 until pivot element 37 has assumed a top dead center position. In this context, the contact position can be set in accordance with the particular requirements by rotating spindle 39.

In operation, heat-sealing device 1 is moved in the direction opposite to that indicated by arrow A along the overlapping film edges (which are not depicted here). In the process, the top film edge, as indicated by arrow B, enters at the input side into a gap between housing 2 and crossmember 3 or longitudinal member 4, and is then guided over upper heating surface 12 of heating element 10. Simultaneously, the lower film edge—the right-hand film edge in the direction toward the input side (arrow A)—enters the heat-sealing device from below in the direction of arrow C, and is guided by a contact roller 46 over lower heating surface 13 of heating element 10. The upper film edge is additionally pressed by two contact rollers 47, 48 against upper heating surface 12, which is guided in rocker fashion on bridge piece 30.

The upper and lower heating surfaces 12, 13 are, like pressure rollers 16, 27, divided in the transverse direction, i.e. they each have two heating surface sections, extending in the longitudinal direction, which are identical in width and spacing to roller sections 17, 18 and 28, 29 respectively, and are located as prolongations thereof. In this fashion, the film edges each receive, on the sides facing one another, two heat-plasticized strips located next to one another, spaced apart and running parallel. Pressure rollers 16, 27 press these strips toward one another, of course when pressure rollers 16, 27 are in the contact position. The film edges are thus joined to one another by two spaced-apart heat-sealed seams, a testing channel being formed between the heat-sealed seams. By applying compressed air, it is possible to ascertain whether the heat-sealed seams leak at any point.

Since pressure rollers 16, 27 are driven, they serve not only to exert pressure on the film edges but also drive heat-sealing device 1, specifically in such a way that heat-sealing device 1 pulls itself along the film edges.

In order to achieve high quality in the heat-sealed seams, it has proven to be very essential that the two rotary shafts 15, 24 run absolutely parallel to one another. A situation of this kind is apparent from FIG. 5. In this case identical pressure is being applied to each of the plasticized strips.

FIG. 5 shows the ideal situation. It may happen, however, that the two pivot arms 21, 22 pivot in such a way that one is located farther down than the other. This kind of situation is apparent from FIG. 4, where pivot arm 21 is pivoted somewhat farther down than the other pivot arm 22. The result of this is that rotary shaft 24 is not exactly parallel to rotary shaft 15, but rather is slightly oblique. This in turn means that only the left-hand (in this view) roller sections 17, 28 are in contact with one another, and not even with linear contact but rather with point contact. The right-hand roller sections 18, 29 are spaced apart from one another. It is evident that as the film edges are passed through, different pressures are applied to the two plasticized strips, with the result that the plasticized strips which are acted upon by the two right-hand roller sections 18, 29 are insufficiently pressed against one another, and the heat-sealed seam produced there is accordingly not sufficiently strong and tight.

Parallelism between the two rotary shafts 15, 24 can, however, be restored as follows. For this purpose adjustment screws 33, 34, with which bridge piece 30 is joined to pivot arm 22, are loosened. As is apparent from the magnified portion in FIG. 3, screw heads 49, 50 of adjustment screws 33, 34 and the threaded portions continuous therewith sit in stepped holes 51, 52 whose inner sides are at a distance from screw heads 49, 50, and the sections continuous therewith, of adjustment screws 33, 34. Screw heads 49, 50 are thus movable within holes 51, 52 after adjustment screws 33, 34 are loosened. This movability allows a slight joggling of the two arms 21, 22 with respect to one another (FIG. 4). The slight angular joggling which occurs in the bearings of shaft 24 and arms 21, 22 at point 23 is not problematic in terms of function. By exertion of pressure onto pivot arm 22 from above, the latter is then pivoted downward until the right-side roller sections 18, 29 are in linear contact against one another, i.e. until the situation shown in FIG. 5 exists. Adjustment screws 33, 34 are then tightened again so that the position of pivot arms 21, 22 with respect to one another is secured by bridge piece 30. Transverse shaft 23 is then, however, also once again set parallel to rotary shaft 15.

What is claimed is:

1. A heat-sealing device for heat-sealing overlapping film edges, said heat-sealing device comprising:
   a) first and second spaced shafts, each shaft having ends and carrying a pressure roller and defining a shaft axis;
   b) first and second spaced pivot arms independently pivotable about a pivot axis parallel to at least one of said shaft axes, each of said arms operatively associated with an end of said first shaft;
   c) an adjustment assembly is operatively associated with said first shaft for achieving parallel alignment of said first and second shafts and thereby of said pressure rollers, said adjustment assembly including an adjustment device; and
   d) said second shaft is fixed relative to said pivot axis.

2. The heat-sealing device of claim 1, wherein
   a) a second adjustment device is operatively associated with said first shaft for achieving parallel alignment of said first and second shafts and thereby of said pressure rollers.

3. The heat-sealing device of claim 1, wherein
   a) said adjustment assembly further includes a bridge.

4. The heat-sealing device of claim 3, wherein
   a) said bridge extends between and is connected to said pivot arms.

5. The heat-sealing device of claim 4, wherein
   a) said adjustment device is disposed between an end of said bridge and said first pivot arm.

6. The heat-sealing device of claim 4, wherein
   a) a second adjustment device is operatively associated with said first shaft for achieving parallel alignment of said first and second shafts and thereby of said pressure rollers.

7. The heat-sealing device of claim 5, wherein said adjustment device comprises:
   a) a plurality of threaded fasteners, each of said fasteners having an axis and a threaded portion and a head portion with a diameter;
   b) a plurality of stepped holes formed in said first pivot arm, each of said stepped holes including an exteriorly-disposed portion having walls with a diameter larger than said head diameter and an interiorly-disposed portion having walls with a diameter smaller than said head diameter;
   c) a plurality of threaded holes formed in said bridge for securely receiving said threaded portions when said threaded fasteners are inserted through said stepped holes and into said threaded holes; and
   d) said threaded portions of each of said threaded fasteners are inserted through said stepped holes and secured by said threaded holes, wherein a gap between said head and said walls of said exteriorly-disposed portion allows said threaded fasteners to be displaceable from first pivot arm, thereby allowing said bridge to be displaceable from said first pivot arm.

8. The heat-sealing device of claim 7, wherein
   a second adjustment device is disposed between another end of said bridge and said second pivot arm.

9. The heat-sealing device of claim 1, wherein
   a) said adjustment device is disposed between one of said first spaced shaft ends and said first arm.

10. The heat-sealing device of claim 9, wherein said adjustment device comprises:
    a) a plurality of threaded fasteners, each of said fasteners having an axis and a threaded portion and a head portion with a diameter;
    b) a plurality of stepped holes formed in said first pivot arm, each of said stepped holes including an exteriorly-disposed portion having walls with a diameter larger than said head diameter and an interiorly-disposed portion having walls with a diameter smaller than said head diameter;
    c) a plurality of threaded holes formed in said one of said first spaced shaft ends for securely receiving said threaded portions when said threaded fasteners are inserted through said stepped holes and into said threaded holes; and
    d) said threaded portions of each of said threaded fasteners are inserted through said stepped holes and secured by said threaded holes, wherein a gap between said head and said walls of said exteriorly-disposed portion allows said threaded fasteners to be displaceable from first pivot arm, thereby allowing said first spaced shaft to be displaceable from said first pivot arm.

11. The heat-sealing device of claim 10, wherein
    a) a second adjustment device is operatively associated with said first shaft for achieving parallel alignment of said first and second shafts and thereby of said pressure rollers, said second adjustment device is disposed between another of said first spaced shaft ends and said second arm.

12. The heat-sealing device of claim 9, wherein
    a) a second adjustment device is operatively associated with said first shaft for achieving parallel alignment of said first and second shafts and thereby of said pressure rollers, said second adjustment device disposed between another of said first spaced shaft ends and another of said arms.

13. A heat-sealing assembly for heat-sealing overlapping film edges, said assembly comprising:
   a) a housing movable across a surface, said housing having upper and lower portions and input and output ends;
   b) a heating element operatively associated with said housing for heat-softening film edges before heat-sealing of the film edges;
   c) first and second spaced shafts, each shaft having ends and carrying a pressure roller and defining a shaft axis;
   d) first and second spaced pivot arms independently pivotable about a pivot axis parallel to at least one of said shaft axes, each of said arms operatively associated with an end of said first shaft;
   e) said pivot axis is fixed relative to said second shaft; and
   f) an adjustment assembly operatively associated with said first shaft for achieving parallel alignment of said first and second shafts and thereby of said pressure rollers, said adjustment assembly including an adjustment device.

14. The heat-sealing assembly of claim 13, wherein
   a) a second adjustment device is operatively associated with said first shaft for achieving parallel alignment of said first and second shafts and thereby of said pressure rollers.

15. The heat-sealing assembly of claim 13, wherein
   a) said adjustment assembly includes a bridge.

16. The heat-sealing assembly of claim 15, wherein
   a) said bridge has ends and extends between and is connected to said pivot arms.

17. The heat-sealing assembly of claim 16, wherein
   a) said adjustment device is disposed between one of said bridge ends and said first pivot arm.

18. The heat-sealing assembly of claim 17, wherein said adjustment device comprises:
   a) a plurality of threaded fasteners, each of said fasteners having an axis and a threaded portion and a head portion with a diameter;
   b) a plurality of stepped holes formed in said first pivot arm, each of said stepped holes including an exteriorly-disposed portion having walls with a diameter larger than said head diameter and an interiorly-disposed portion having walls with a diameter smaller than said head diameter;
   c) a plurality of threaded holes formed in said bridge for securely receiving said threaded portions when said threaded fasteners are inserted through said stepped holes and into said threaded holes; and
   d) said threaded portions of each of said threaded fasteners are inserted through said stepped holes and secured by said threaded holes, wherein a gap between said head and said walls of said exteriorly-disposed portion allows said threaded fasteners to be displaceable from first pivot arm, thereby allowing said bridge to be displaceable from said first pivot arm.

19. The heat-sealing assembly of claim 13, wherein
   a) said adjustment device is disposed between one of said first spaced shaft ends and said first arm.

20. The heat-sealing assembly of claim 13, wherein said adjustment device comprises:
   a) a plurality of threaded fasteners, each of said fasteners having a threaded portion and a head portion with a diameter;
   b) a plurality of stepped holes formed in said first pivot arm, each of said stepped holes including an exteriorly-disposed portion having walls with a diameter larger than said head diameter and an interiorly-disposed portion having walls with a diameter smaller than said head diameter;
   c) a plurality of threaded holes formed in said one of said first spaced shaft ends for securely receiving said threaded portions when said threaded fasteners are inserted through said stepped holes and into said threaded holes; and
   d) said threaded portions of each of said threaded fasteners are inserted through said stepped holes and secured by said threaded holes, wherein a gap between said head and said walls of said exteriorly-disposed portion allows said threaded fasteners to be displaceable from said first pivot arm, thereby allowing said first spaced shaft to be displaceable from said first pivot arm.

\* \* \* \* \*